(12) United States Patent
Shen (10) Patent No.: US 9,802,549 B1
(45) Date of Patent: Oct. 31, 2017

(54) BICYCLE CARRIER

(71) Applicant: KING ROOF INDUSTRIAL CO., LTD., Taichung (TW)

(72) Inventor: Shih-Chieh Shen, Taichung (TW)

(73) Assignee: KING ROOF INDUSTRIAL CO., LTD, Taichung (TW)

( * ) Notice: Subject to any disclaimer, the term of this patent is extended or adjusted under 35 U.S.C. 154(b) by 0 days.

(21) Appl. No.: 15/360,046

(22) Filed: Nov. 23, 2016

(51) Int. Cl.
  *B60R 9/00* (2006.01)
  *B60R 9/10* (2006.01)
  *B60R 9/06* (2006.01)

(52) U.S. Cl.
  CPC . *B60R 9/10* (2013.01); *B60R 9/06* (2013.01)

(58) Field of Classification Search
  CPC .................................... B60R 9/10; B60R 9/06
  USPC .................................................. 224/282, 924
  See application file for complete search history.

(56) References Cited

U.S. PATENT DOCUMENTS

| | | | | |
|---|---|---|---|---|
| 5,094,373 A * | 3/1992 | Lovci | ...................... | B60R 9/06 224/282 |
| 5,454,496 A * | 10/1995 | Sumida, Jr. | ............... | B60R 9/06 224/509 |
| 5,518,159 A * | 5/1996 | DeGuevara | ............... | B60R 9/10 224/282 |
| 5,544,799 A * | 8/1996 | Didlake | ..................... | B60R 9/06 224/282 |
| 5,664,717 A * | 9/1997 | Joder | ........................ | B60R 9/10 224/502 |
| 5,775,560 A * | 7/1998 | Zahn | ......................... | B60R 9/06 224/485 |
| 6,237,823 B1 * | 5/2001 | Stewart | ................... | B60R 9/065 224/282 |
| 6,659,318 B2 * | 12/2003 | Newbill | ................. | B62D 43/02 224/282 |
| 6,745,926 B2 * | 6/2004 | Chimenti | .................. | B60R 9/06 224/495 |
| 7,815,083 B2 * | 10/2010 | Clausen | ................... | B60R 9/06 224/497 |
| 2003/0057245 A1 * | 3/2003 | Dean | ........................ | B60R 9/06 224/519 |
| 2006/0037986 A1 * | 2/2006 | Wang | ........................ | B60R 9/10 224/521 |
| 2014/0263512 A1 * | 9/2014 | McCoy et al. | ............ | B60R 9/06 224/519 |

* cited by examiner

*Primary Examiner* — Brian D Nash
(74) *Attorney, Agent, or Firm* — Muncy, Geissler, Olds & Lowe, P.C.

(57) ABSTRACT

A bicycle carrier includes a base rack, a main body, and a restriction element. The base rack is connected to a vehicle body and a limiting element therebetween. The limiting element has a horizontal sliding groove and an arc sliding groove which is below the horizontal sliding groove. An end of the main body is pivotally connected to the limiting element, and the other end is connected to a supporting element. The main body is formed with an elongated groove corresponding to the horizontal and the arc sliding grooves. The restriction element is inserted through the main body and is connected to the limiting element via an elastic element. A pin element is inserted through the restriction element to be slidable in the elongated groove. The elastic element makes the restriction element tend to move toward the base rack.

7 Claims, 9 Drawing Sheets

BICYCLE CARRIER

BACKGROUND OF THE INVENTION

Field of the Invention

The present invention relates to a bicycle carrier.

Description of the Prior Art

A conventional bicycle carrier is usually installed on a lower portion of the rear end of vehicle. For an ordinary car having a trunk, the trunk cover is pivoted upward and frontward when opening the trunk cover. Thus, the bicycle carrier may not hinder the pivoting of the trunk cover.

However, a vehicle lacking of trunk, such as a van, has no trunk cover. On the contrary, it has a rear door. To open the rear door, the rear door is pivoted backward and upward. Thus, the rear door can not be opened smoothly because of the hindrance by the bicycle carrier. As a result, to open the rear door, the bicycle carrier has to be detached in advance.

SUMMARY OF THE INVENTION

The main object of the present invention is to provide a bicycle carrier which is pivot downward to allow the rear door of the vehicle to open or to close.

To achieve the above and other objects, a bicycle carrier of the present invention includes a connection structure, a supporting structure, and a restriction element.

The connection structure includes a base rack and a limiting element. An end of the base rack is adapted for connecting to a vehicle body, and an opposite end of the base rack is connected with the limiting element. The limiting element is formed with at least one horizontal sliding groove and at least one arc sliding groove. The horizontal sliding groove communicates with the arc sliding groove. The arc sliding groove is located below the horizontal sliding groove and extends downward from the horizontal sliding groove.

The supporting structure includes main body and a supporting element. An end of the main body is pivotally connected to the limiting element, and an opposite end of the main body is connected to the supporting element. The supporting element is adapted for support an object. The main body is formed with an elongated groove corresponding to the horizontal sliding groove and the arc sliding groove.

The restriction element is inserted through the main body to connect with one of the limiting element and the main body via an elastic element. A pin element is inserted through the restriction element and the elongated groove to be slidably arranged in the elongated groove so that the restriction element is movable with respect to the main body between a first position and a second position. The first position is closer to the connection structure than the second position is. The restriction element tends to move toward the first position due to the elastic element.

When the restriction element is located at the first position, the pin element is located in the horizontal sliding groove. When the restriction element is located at the second position, the pin element is able to enter the arc sliding groove and to further move downward so that the main body is pivoted downward to a folding position.

Thereby, when the bicycle carrier is installed on a vehicle body having a rear door, the rear door can be smoothly opened or closed after pivoting the bicycle carrier downward.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 9, the bicycle carrier of the present invention includes a connection structure 10, a supporting structure 20, and a restriction element 30.

The connection structure 10 includes a base rack 11 and a limiting element 12. The base rack 11 is connected with a vehicle body 40 with an end thereof and is connected with the limiting element 12 with the other end thereof. The limiting element 12 is formed with at least one horizontal sliding groove 122 and at least one arc sliding groove 123. The horizontal sliding groove 122 communicates with the arc sliding groove 123. The arc sliding groove 123 is located below the horizontal sliding groove 122 and extends downward from the horizontal sliding groove 122.

The supporting structure 20 includes a main body 21 and at least one supporting element 22. The main body 21 is pivotally connected to the limiting element 12 with an end thereof and is connected to the supporting element 22 with the other end thereof. The supporting element 22 is adapted for support an object, such as a bicycle. The main body 21 is formed with an elongated groove 211. The elongated groove 211 positionally corresponds to the horizontal sliding groove 122 and the arc sliding groove 123. Preferably, the supporting element 22 extends upward from an end of the main body 21 remote from the connection structure 10.

Figure 1:
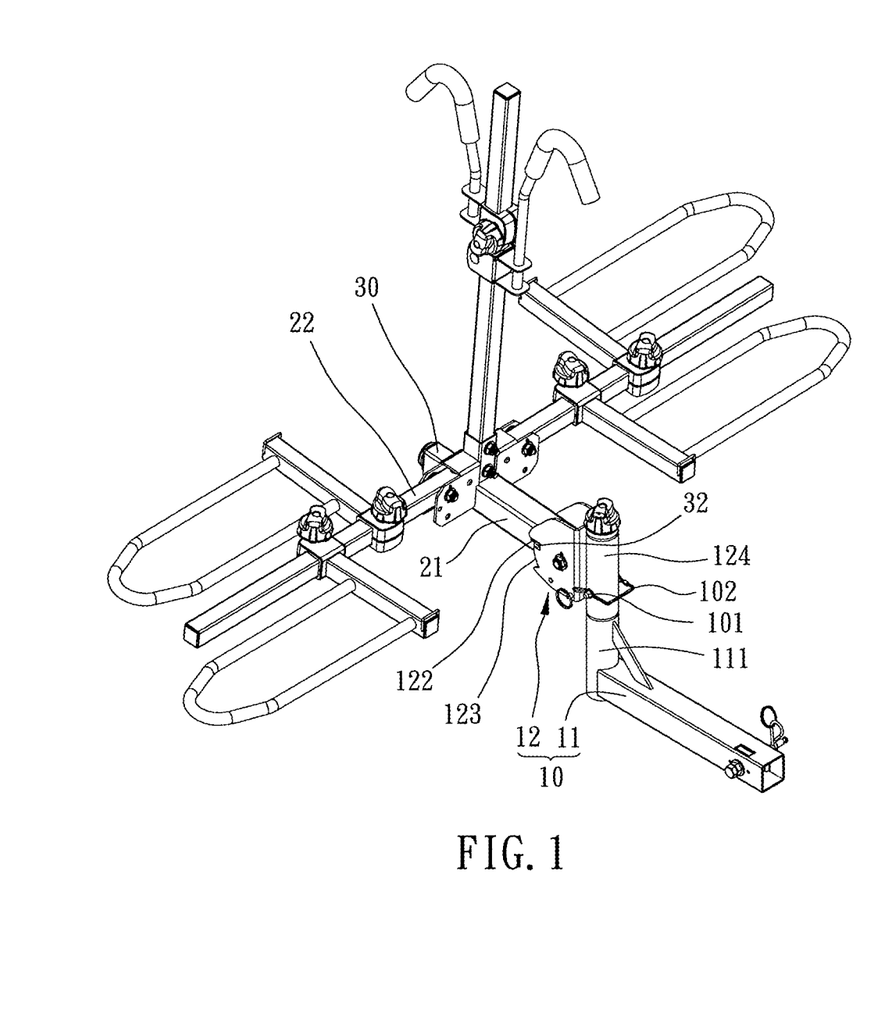
FIG. 1 is a stereogram of the present invention.
Figure 2:
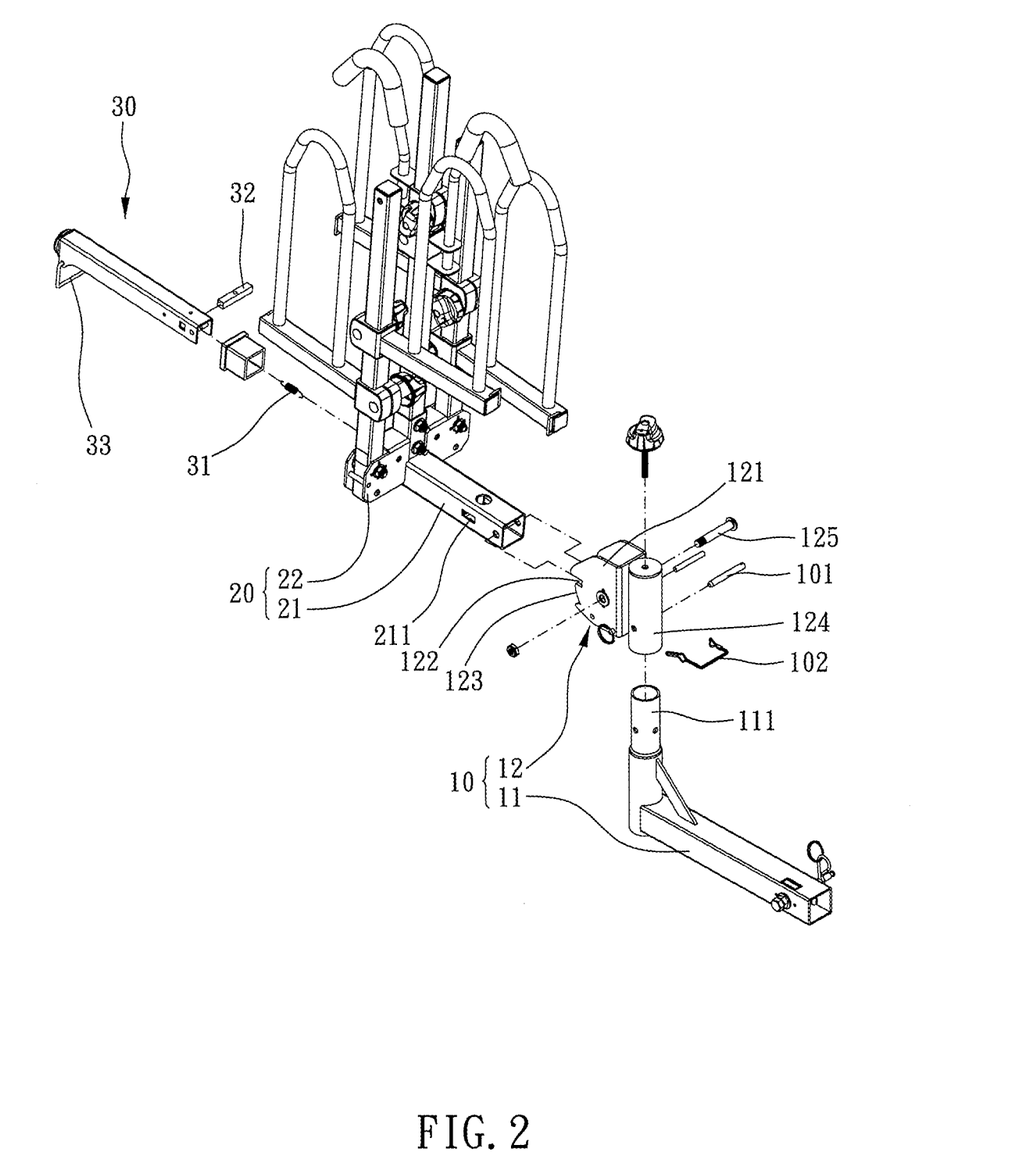
FIG. 2 is a breakdown drawing of the present invention.
Figure 3:
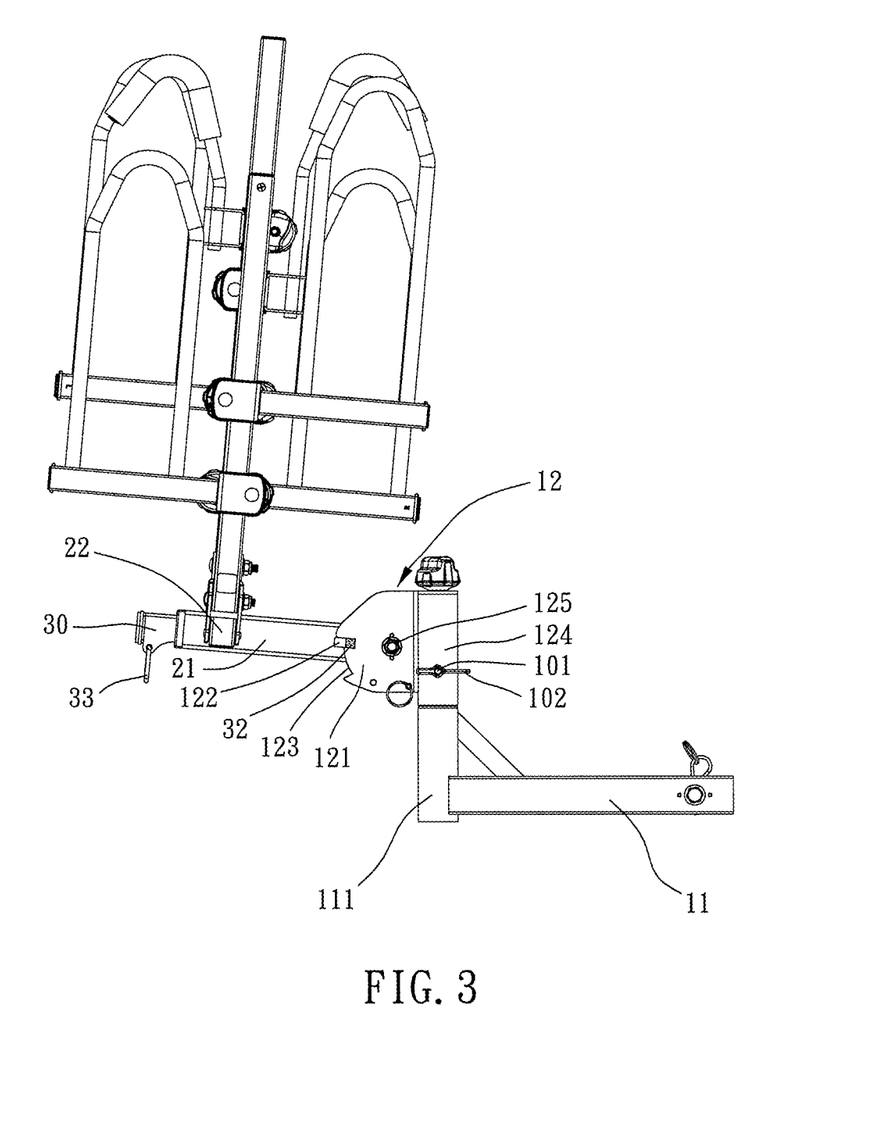
FIG. 3 is a lateral view of the present invention.
Figure 4:
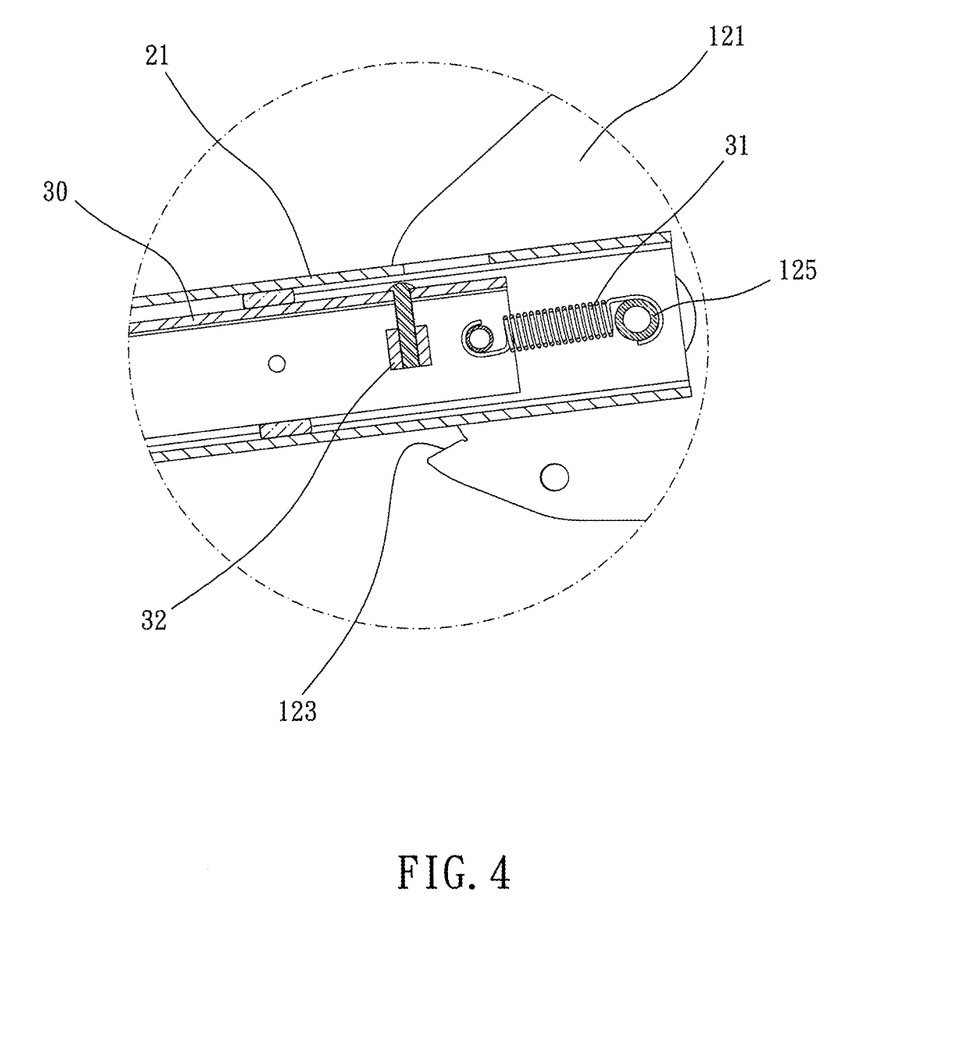
FIG. 4 is a partial cross-section view of the present invention.
Figure 5:
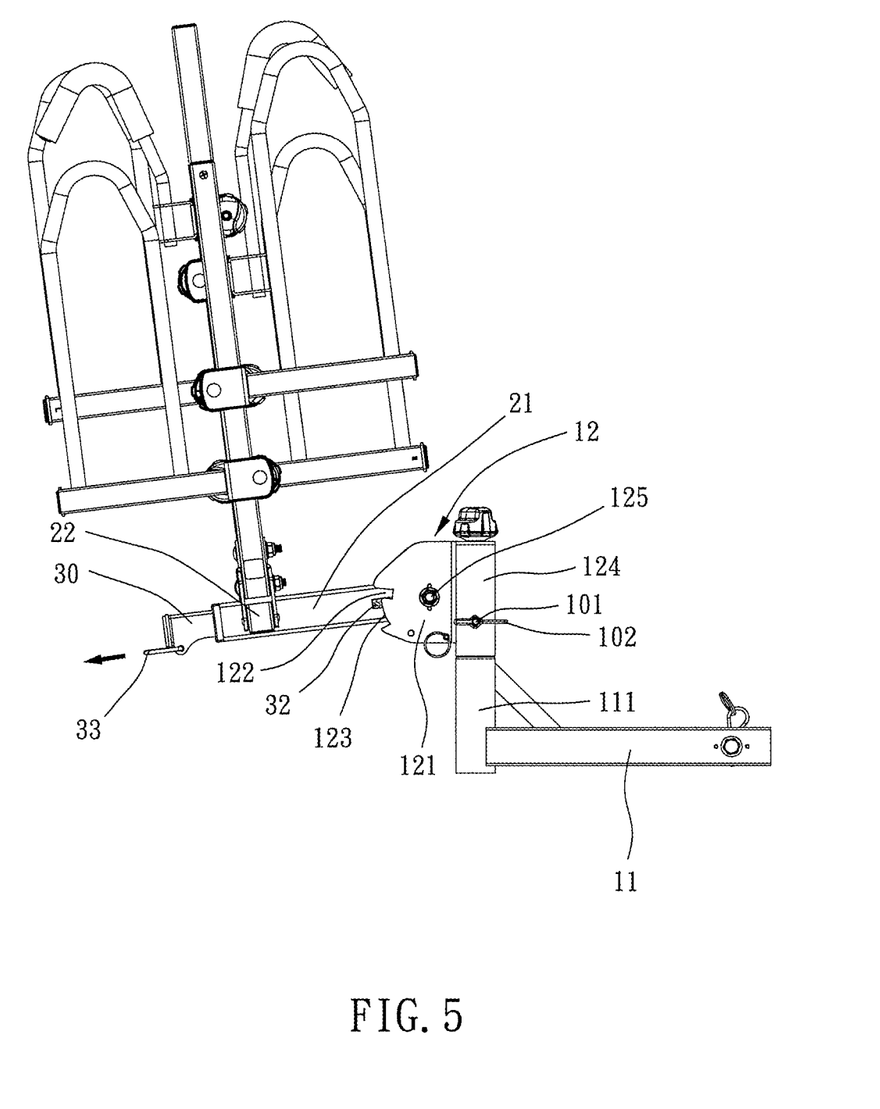
FIGS. 5 and 6 are illustrations of the present invention.
Figure 6:
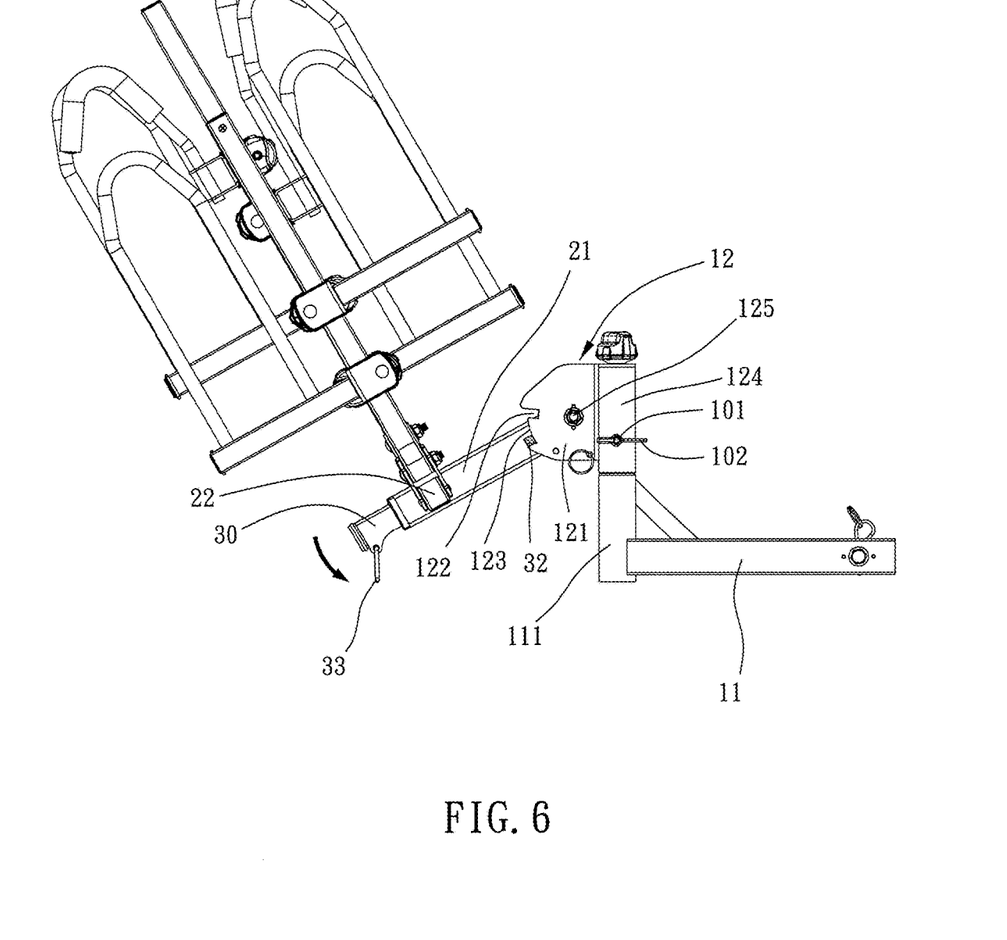
Figure 7:
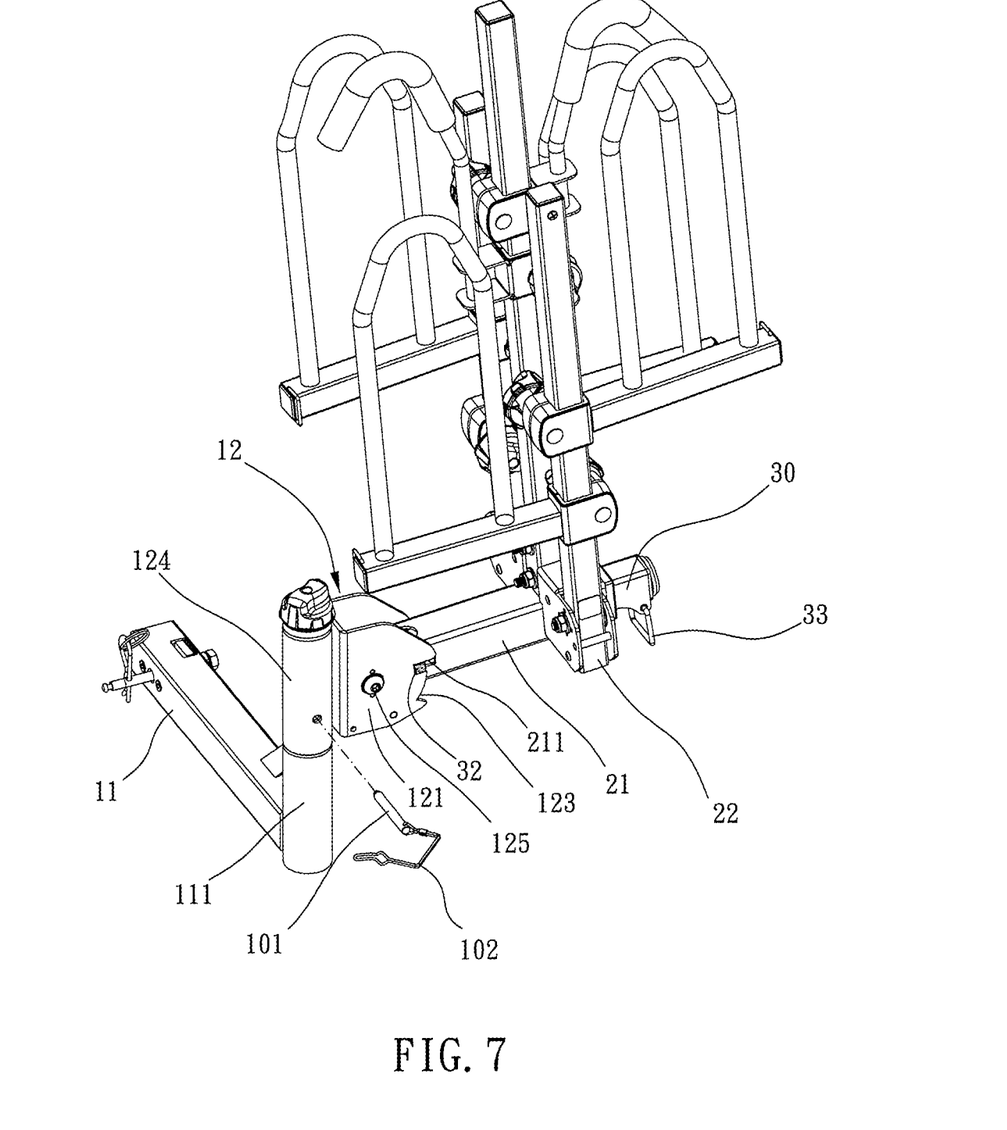
FIGS. 7 and 8 are illustration of the present invention when rotation.
Figure 8:
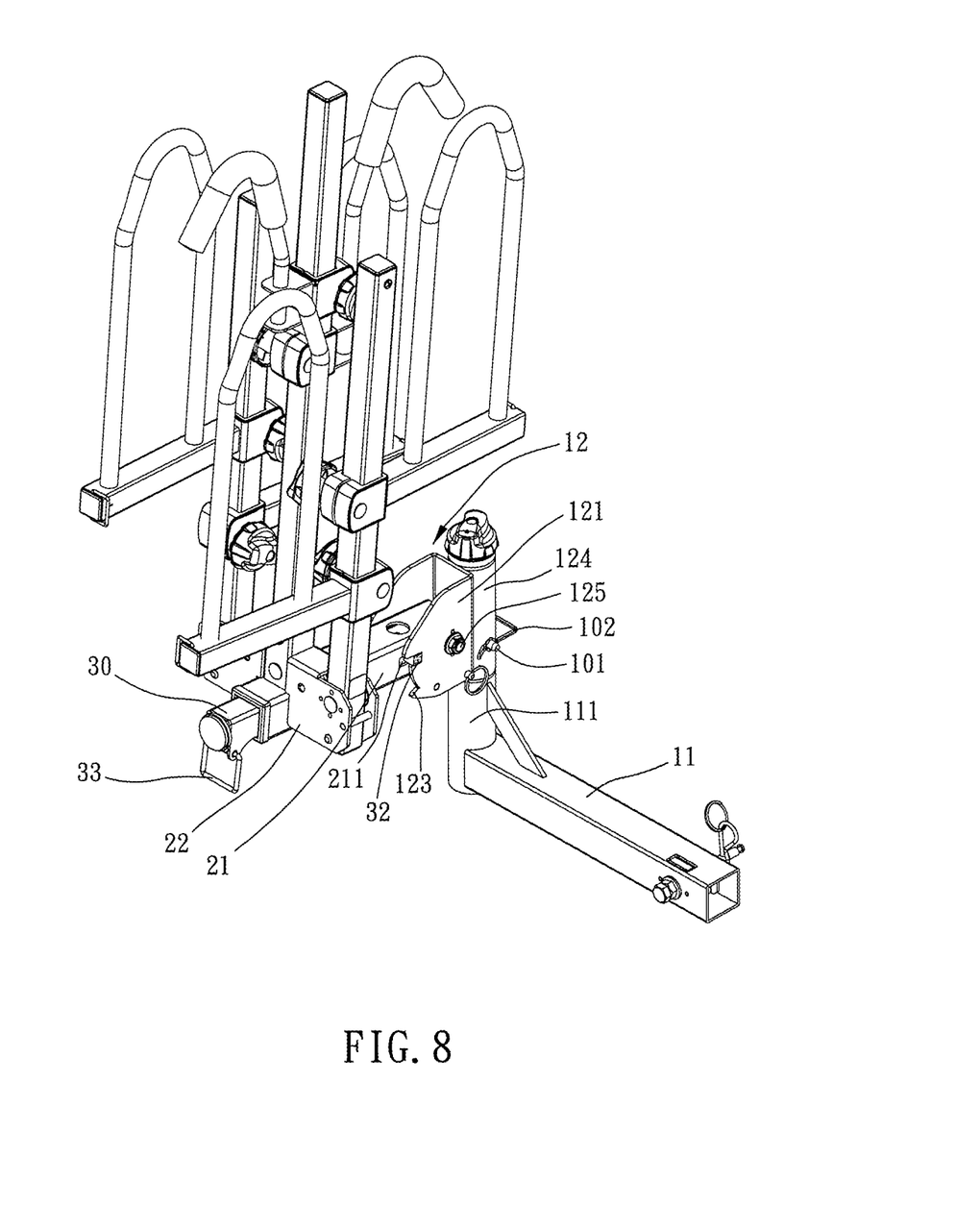
Figure 9:
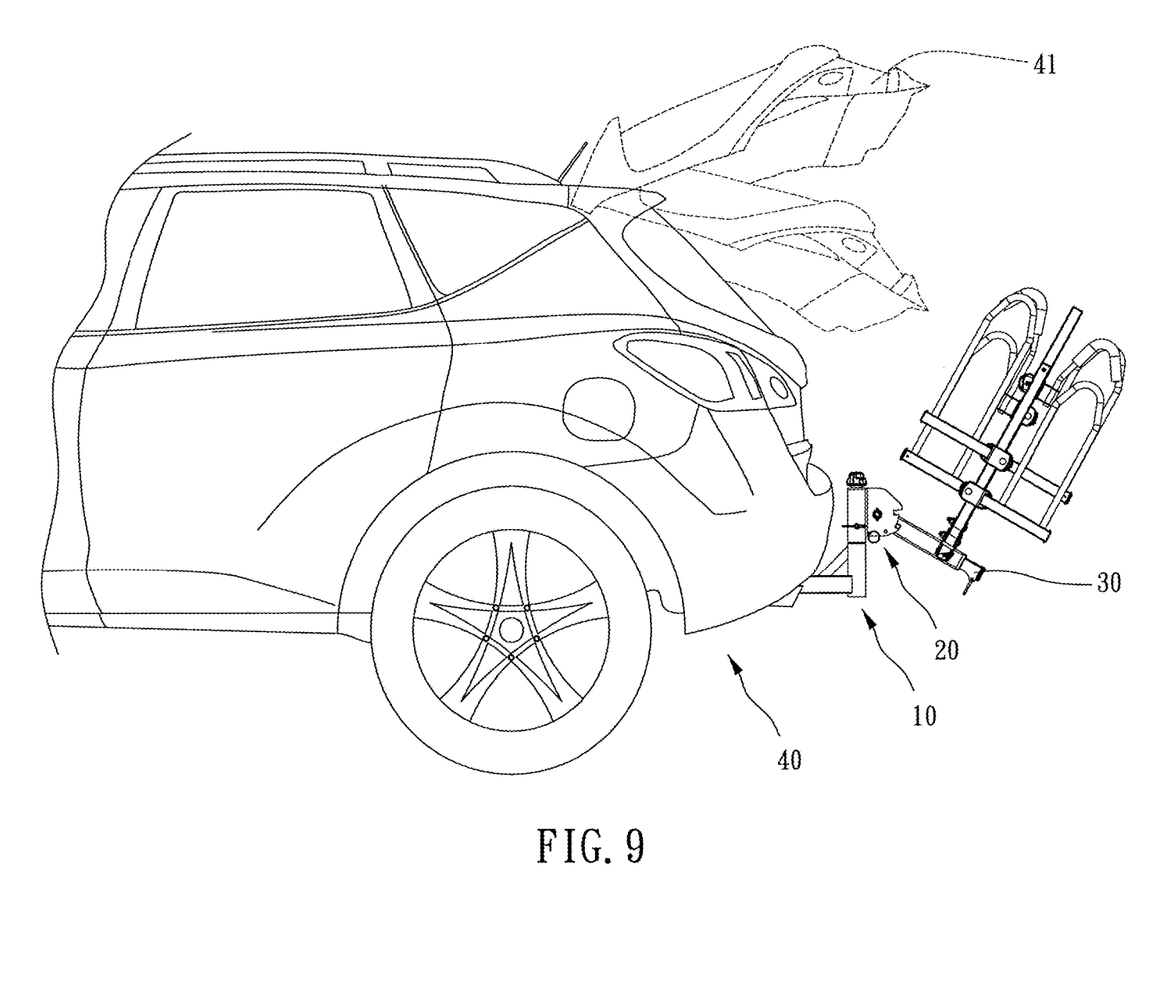
FIG. 9 is an illustration of the present invention.

The restriction structure 30 is inserted through the main body 21 and is connected to one of the limiting element 12 and the main body 21 with an elastic element 31. A pin element 32 is inserted through the restriction element 30 and the elongated groove 211 of the main body 21 to be slidable along the elongated groove 211 so that the restriction element 30 is able to move with respect to the main body 21 between a first position and a second position. The first position is closer to the connection structure 10 than the second position is. The elastic element 31 makes the restriction element 30 tend to move toward the first position. Preferably, the restriction element 30 is disposed with a lever 33 at an end thereof remote from the limiting element 12 for pulling. When the restriction element 30 is located at the first position, as shown in FIG. 3, the pin element 32 is located in the horizontal sliding groove 122. When the restriction element 30 is located at the second position, as shown in FIG. 5, the pin element 32 is able to enter the arc sliding groove 123 and to further move downward so that the main body 21 is pivoted to a folding position, as shown in FIG. 6.

In the present embodiment, the limiting element 12 has two lateral walls 121, and a space is enclosed and defined between the two lateral walls 121. The space receives an end of the main body 21. The limiting element 12 has two horizontal sliding grooves 122 and two arc sliding grooves 123. Each lateral wall 121 is formed with one of the horizontal sliding groove 122 and the arc sliding groove 123 at an end thereof remote from the base rack 11. The main body 21 is formed with two elongated grooves 211 on two opposite sides thereof. The main body 21 is pivotally connected to the limiting element 12 by a pivot axle 125. An end of the elastic element 31 is connected to the restriction element 30, and the other end of the elastic element 31 is connected to the pivot axle 125. The pivot axle 125 is inserted through the two lateral walls 121 and the space.

Besides, the connection structure 10 further includes a rotation mechanism including a first rotation element 111, a second rotation element 124, a positioning pin 101, and a positioning element 102. The first rotation element 111 is disposed on the base rack 11, and the second rotation element 124 is disposed on the limiting element 12. The first rotation element 111 is rotatably connected with the second rotation element 124. The first rotation element 111 has a plurality of first positioning holes, and the second rotation element 124 has a plurality of second positioning holes. When at least two of the first positioning holes and at least two of the second positioning holes positionally correspond to each other, the positioning pin 101 is able to insert through the at least two of the first positioning holes and the at least two of the second positioning holes. The positioning element 102 is connected to two ends of the positioning pin 101 therebetween to prevent the positioning pin 101 from being removed from the first rotation element 111 and the second rotation element 124.

In the ordinary situation, the pin element 32 retains at an end of the horizontal sliding groove 122 closer to the base rack 11 due to the elastic element 31 and to be unable to enter the arc sliding groove 123. Thus, the supporting element 22 can support an object, such as a bicycle. However, if the bicycle carrier is installed on the vehicle body 40 of vehicles having rear door 41, such as a van, the rear door 41 may be unable to be closed or opened because of the supporting element 22. Thus, before closing or opening the rear door 41, the user can pull the restriction element 30 to move the pin element 32 toward the other end of the horizontal sliding groove 122 so that the pin element 32 can enter the arc sliding element 123 and further move downward. Thereby, the main body 21 and the supporting element 22 are pivoted downward. That is, the supporting element 22 pivots away from the rear door 41. Thereby, the rear door 41 is able to be closed or opened smoothly. To reset the bicycle carrier, the user can pivot the main body 21 and the supporting element 22 upward to move the pin element 32 upward so that the pin element 32 enters the horizontal sliding groove 122. And then, the restriction element 30 further moves toward the base rack 11 to the first position due to the elastic force of the elastic element 31.

In conclusion, the bicycle carrier of the present invention is easy to use and has a simple structure. In addition, the rear door of the vehicle can be opened or closed smoothly without detaching the bicycle carrier.

What is claimed is:

1. A bicycle carrier including:
    a connection structure, including a base rack and a limiting element, an end of the base rack being adapted for connecting to a vehicle body, an opposite end of the base rack being connected with the limiting element, the limiting element being formed with at least one horizontal sliding groove and at least one arc sliding groove, the horizontal sliding groove communicating with the arc sliding groove, the arc sliding groove being located below the horizontal sliding groove and extending downward from the horizontal sliding groove;
    a supporting structure, including a main body and a supporting element, an end of the main body being pivotally connected to the limiting element, an opposite end of the main body being connected to the supporting element, the supporting element being adapted for support of an object, the main body being formed with an elongated groove corresponding to the horizontal sliding groove and the arc sliding groove; and
    a restriction element, inserted through the main body to connect with one of the limiting element and the main body via an elastic element, a pin element being inserted through the restriction element and the elongated groove to be slidably arranged in the elongated groove so that the restriction element is movable with respect to the main body between a first position and a second position, the first position being closer to the connection structure than the second position is, the restriction element tending to move toward the first position due to the elastic element;
    wherein the pin element is located in the horizontal sliding groove when the restriction element is located at the first position, the pin element being able to enter the arc sliding groove and to further move downward so that the main body is pivoted downward to a folding position when the restriction element is located at the second position.

2. The bicycle carrier of claim 1, wherein the connection structure further includes a rotation mechanism, the rotation mechanism includes a first rotation element and a second rotation element, the first rotation element is disposed on the base rack, the second rotation element is disposed on the limiting element, the first rotation element is rotatably connected to the second rotation element.

3. The bicycle carrier of claim 2, wherein the rotation mechanism further includes a positioning pin and a positioning element, the first rotation element has a plurality of first positioning holes, the second rotation element has a plurality of second positioning holes, when at least two of the first positioning holes and at least two of the second positioning holes positionally correspond to each other, the positioning pin is able to insert through the at least two of the first positioning holes and the at least two of the second positioning holes, the positioning element is connected to two ends of the positioning pin therebetween to prevent the positioning pin from being removed from the first rotation element and the second rotation element.

4. The bicycle carrier of claim 1, wherein the limiting element has two lateral walls, a space is enclosed between the two lateral walls, the space receives an end of the main body, the limiting element has two horizontal sliding grooves and two arc sliding grooves, each lateral wall is formed with one of the horizontal sliding groove and the arc sliding groove at an end thereof away from the base rack, the main body is formed with two elongated grooves on two opposite sides.

5. The bicycle carrier of claim 4, wherein the main body and the limiting element are pivotally connected by a pivot axle, an end of the elastic element is connected to the restriction element, an opposite end of the elastic element is connected to the pivot axle, the pivot axle is inserted through the two lateral walls and the space.

6. The bicycle carrier of claim 1, wherein an end of the restriction element away from the limiting element is disposed with a lever for pulling.

7. The bicycle carrier of claim 1, wherein the supporting element extends upward from an end of the main body away from the connection structure.

\* \* \* \* \*